(12) United States Patent
Neumann

(10) Patent No.: US 6,301,525 B1
(45) Date of Patent: Oct. 9, 2001

(54) SYSTEM AND METHOD FOR CONTROLLING A ROBOT

(75) Inventor: Karl-Erik Neumann, Gräddö (SE)

(73) Assignee: Neos Robotics AB (SE)

( * ) Notice: Subject to any disclaimer, the term of this patent is extended or adjusted under 35 U.S.C. 154(b) by 0 days.

(21) Appl. No.: 09/486,023
(22) PCT Filed: Jun. 17, 1999
(86) PCT No.: PCT/SE99/01095
§ 371 Date: Feb. 18, 2000
§ 102(e) Date: Feb. 18, 2000
(87) PCT Pub. No.: WO99/67066
PCT Pub. Date: Dec. 29, 1999

(30) Foreign Application Priority Data

Jun. 25, 1998 (SE) .................................................. 9802268

(51) Int. Cl.$^7$ ....................................................... G06F 19/00
(52) U.S. Cl. .......................... 700/245; 700/160; 700/249; 700/251; 700/254; 700/257; 700/259; 700/260; 700/264; 701/9; 701/15; 701/19; 701/23; 318/568.1; 318/568.11; 318/568.13; 318/568.15; 318/568.19; 318/573; 414/729
(58) Field of Search .................................... 700/245, 160, 700/254, 257, 249, 251, 259, 260, 264; 701/23, 15, 19, 9; 318/568.1, 568.11, 568.13, 568.15, 568.19, 573; 901/9, 3, 16, 22, 26, 29; 414/729; 74/490.01, 490.06, 479.01; 403/57, 24; 29/407.08; 33/503; 108/138

(56) References Cited

U.S. PATENT DOCUMENTS

| | | | | |
|---|---|---|---|---|
| 4,163,183 | * | 7/1979 | Engelberger et al. | 318/568.13 |
| 4,362,977 | | 12/1982 | Evans et al. | 318/568 |
| 4,543,635 | | 9/1985 | Joo et al. | 700/160 |
| 4,732,525 | * | 3/1988 | Neumann | 414/729 |
| 4,790,718 | | 12/1988 | Vickers | 414/735 |
| 5,797,191 | * | 8/1998 | Ziegert | 33/503 |
| 5,813,287 | | 9/1998 | McMurtry | 74/490.06 |
| 5,987,726 | * | 11/1999 | Akeel | 29/470.08 |
| 6,043,621 | * | 3/2000 | Newmann | 318/568.11 |

FOREIGN PATENT DOCUMENTS

| | | |
|---|---|---|
| 452279 | 11/1987 | (SE) . |
| 509505 | 2/1999 | (SE) . |

OTHER PUBLICATIONS

Zannatha et al., Position and Differential Kinematic Neural Control of Robot manipulators: A Comparison Between Two Schemes, 1993, IEEE, pp. 479–484.*

Vaccaro et al., A Joint–Space Command Generator for Cartesian Control of Robotic Manipulators, 1988, IEEE, pp. 70–76.*

Lee et al., External Sensory Feedback Control for End–Effector of Flexible Multi–Link Manipulators, 1990, IEEE, pp. 1796–1802.*

* cited by examiner

Primary Examiner—William A. Cuchlinski, Jr.
Assistant Examiner—McDieunel Marc
(74) Attorney, Agent, or Firm—Ostrolenk, Faber, Gerb & Soffen, LLP

(57) ABSTRACT

A system and method for controlling a robot (1), includes at least three setting devices (2, 3, 4) which can be extended or shortened in the longitudinal direction. Each setting device being directly or indirectly secured in a fixed frame (6) via a first joint (20, 30, 40) so that each setting device is pivotable in all directions in relation to the frame and that each setting device is attached at one end in a movable position head (8) via a second joint (21, 31, 41). Each sensor is provided with a length sensor ($LS_1$, $LS_2$, $LS_3$), said sensors forming a part of control system (S1) for controlling the location (X, Y, Z), wherein the control system cooperates with a feedback control system (R2) arranged to correct the location (X, Y, Z) and feedback control system (R2) operate in accordance with different coordinate systems.

8 Claims, 3 Drawing Sheets

SYSTEM AND METHOD FOR CONTROLLING A ROBOT

TECHNICAL FIELD

The present invention relates to controlling and correcting the spatial location of the positioning head of a robot. In the following, the term "robot" also covers machine tools of NC type, for instance, since in certain applications the present robot acts as a numerically controlled machine tool.

BACKGROUND ART

According to Patent specification SE 8502327-3 (452 279) a robot with a positioning head, the robot comprising at least three setting devices which can be extended and shortened in longitudinal direction, is already known. Each setting device is secured in a fixed frame via a first joint so that each setting device is pivotable in all directions in relation to the frame. Each setting device is also attached at one end in a movable positioning head via a second joint. A rigid arm is also joined to and emanates from the positioning head between the setting devices, the arm being radially guided but axially displaceably journalled in a universal joint relative to and rigidly connected to the frame.

A similar robot is also known in which the setting devices are secured in a displaceable runner via a first joint, the runner being secured in a fixed frame, so that each setting device is pivotable in all directions in relation to the frame. The joint is thus indirectly secured in the frame.

These known robots are controlled by each setting device being provided with a motor to extend or shorten the setting device. Control is effected by the setting devices being controlled linearly to a predetermined location of the positioning head or the positioning head being controlled along a predetermined pattern of movement. There is thus no control of the set location of the positioning head, which means that the influence of force and temperature on the setting devices, joints, positioning head, etc. results in a difference between the desired set point and the actual position.

This difference between set point and actual position is unsatisfactory and leads to reduced accuracy in the use of the robot.

OBJECT OF THE INVENTION

The object of the present invention is to increase the accuracy of a robot of the type described above.

SUMMARY OF THE INVENTION

This object is achieved by arranging a feedback control system to supplement the existing control system. Characteristic of the invention is first that the existing control system and the feedback control system indicate the coordinates of the positioning head in different coordinate systems. Secondly, the sensors of the feedback control system are placed for measurement on a part which is movable in the robot and accompanies its movement, but which is free of tension. The part is thus not influenced by temperature or force.

The invention thus relates to a control system for a robot, which robot comprises at least three setting devices which can be extended or shortened in the longitudinal direction. Each setting device is secured in a fixed frame via a first joint so that each setting device is pivotable in all directions in relation to the frame. Each setting device is attached at one end in a movable positioning head via a second joint. A rigid arm is joined to, emanates from the positioning head and is arranged between the setting devices, the arm being radially guided but axially displaceably journalled in a universal joint relative to and rigidly connected to the frame. Each setting device is provided with a length sensor $LS_1$, $LS_2$, $LS_3$, said sensors forming a part of a control system S1 for controlling the location (X, Y, Z) of the positioning head in the work space of the robot. The control system thus cooperates with a feedback control system R2 arranged to correct the location (X, Y, Z) of the positioning head in the work space. The control system S1 and feedback control system R2 operate in accordance with different coordinate systems.

The invention also relates to a method for controlling the location of the positioning head of a robot, wherein
a) a control system controls the positioning head in accordance with a cartesian coordinate system,
b) a feedback control system senses the location of the positioning head in accordance with a spherical coordinate system,
c) a coordinate transformation is performed of the location of the positioning head from the spherical coordinate system to the cartesian coordinate system,
d) the deviation obtained between set point and actual position in the cartesian coordinate system is added to the previous set point of the positioning head, thus producing a new set point
e) the location of the positioning head is altered to this new set point,
f) steps a)–e) are repeated to achieve continuous control of the set point.

BRIEF DESCRIPTION OF THE DRAWINGS

In the following the invention will be described in more detail by means of embodiments with reference to the accompanying drawings.

DESCRIPTION OF THE INVENTION

Figure 1:
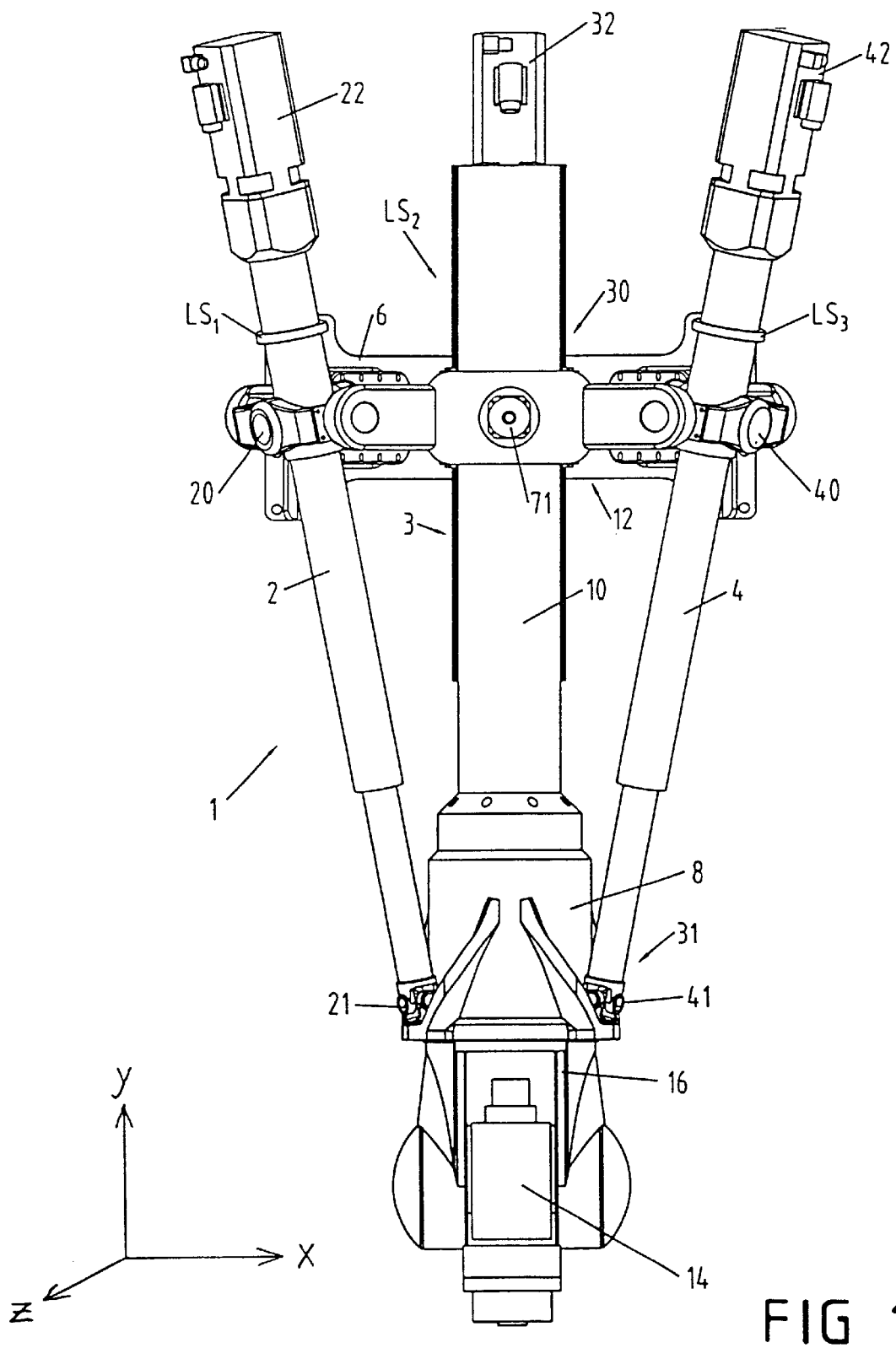
FIG. 1 shows a front view of the robot in accordance with the invention.

The invention relates directly to a robot 1 having at least three setting devices 2, 3, 4 which can be extended or shortened in the longitudinal direction, each setting device being secured in a fixed frame 6 via a first joint 20, 30, 40 so that each setting device 2, 3, 4 is pivotable in all directions in relation to the frame 6. Each setting device is also attached at one end in a movable positioning head 8 via a second joint 21, 31, 41. An intermediate arm 10 is also joined between the setting devices 2, 3, 4 and emanates from the positioning head 8. In FIG. 1 the setting device 3 with its first joint 30 and second joint 31 is hidden by this intermediate arm 10, but these parts are indicated by arrows. Similar to the manner shown in patent specification SE 8502327-3 (452 279), each of the setting devices is in the form of a piston movable in a cylinder.

The arm 10 is connected to the positioning head 8 and extends up between the setting devices. It is radially guided in a universal joint 12 secured to the frame 6. The universal joint 12 permits the arm to slide axially through the joint while being radially guided. The universal joint 12 also permits the arm 10 to be turned an angle α about a first axis and to be turned an angle β about a second axis. The first and second axes intersect each other under the angle 90°.

Each setting device 2, 3, 4, is operated by a motor 22, 32, 42, preferably of electric type, in accordance with a predetermined pattern of movement. The movement pattern forms the basis of a control system S1 which activates respective motors 22, 32, 42 to extend or shorten the setting devices 2, 3, 4, thus causing displacement of the positioning head 8 to a specific location in its work space or to continuously move the positioning head 8 along a given curve in the work space. Each setting device is provided with an angle transducer measuring the motor position, which represents the longitudinal location of the setting device and is thus synonymous with a length sensor $LS_1$, $LS_2$, $LS_3$, which sensors form a part of the control system S1 for controlling the location X, Y, Z of the positioning head in the work space of the robot. The positioning head 8 is thus guided to a position X, Y, Z in a cartesian coordinate system, as indicated by the coordinate system in FIG. 1. As is also clear in FIG. 1, a tool head 14 is connected to the positioning head 8 by connecting means 16, which determine whether the robot is to have 4, 5 or 6 axes. More than six axes is also possible.

Figure 2:
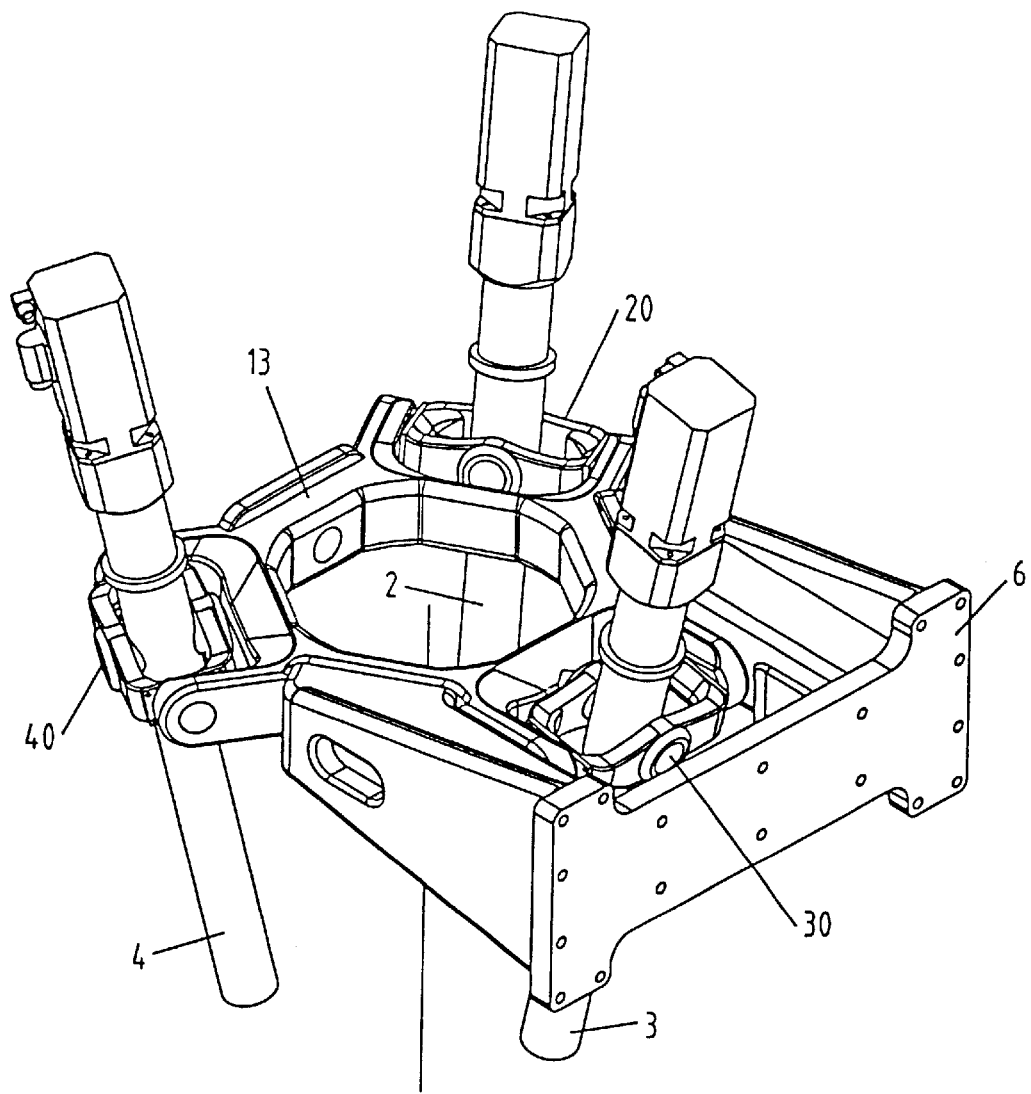
FIG. 2 shows a view in perspective of a fix holder for a universal joint in accordance with the invention.

FIG. 2 shows a part of the robot with the arm 10 and a universal joint housing 13 from which the inner part of the universal joint 12 has been dismantled. The universal joint housing 13 also carries the first joints 20, 30, 40 externally. As is clear in FIG. 2, all these first joints are of universal type, i.e. the setting devices can turn in the joint above two perpendicular axes. However, the joints do not allow the setting devices to be displaced axially through the joints. As described earlier, the movement in axial direction is achieved by the setting device being extended or shortened.

Figure 3:
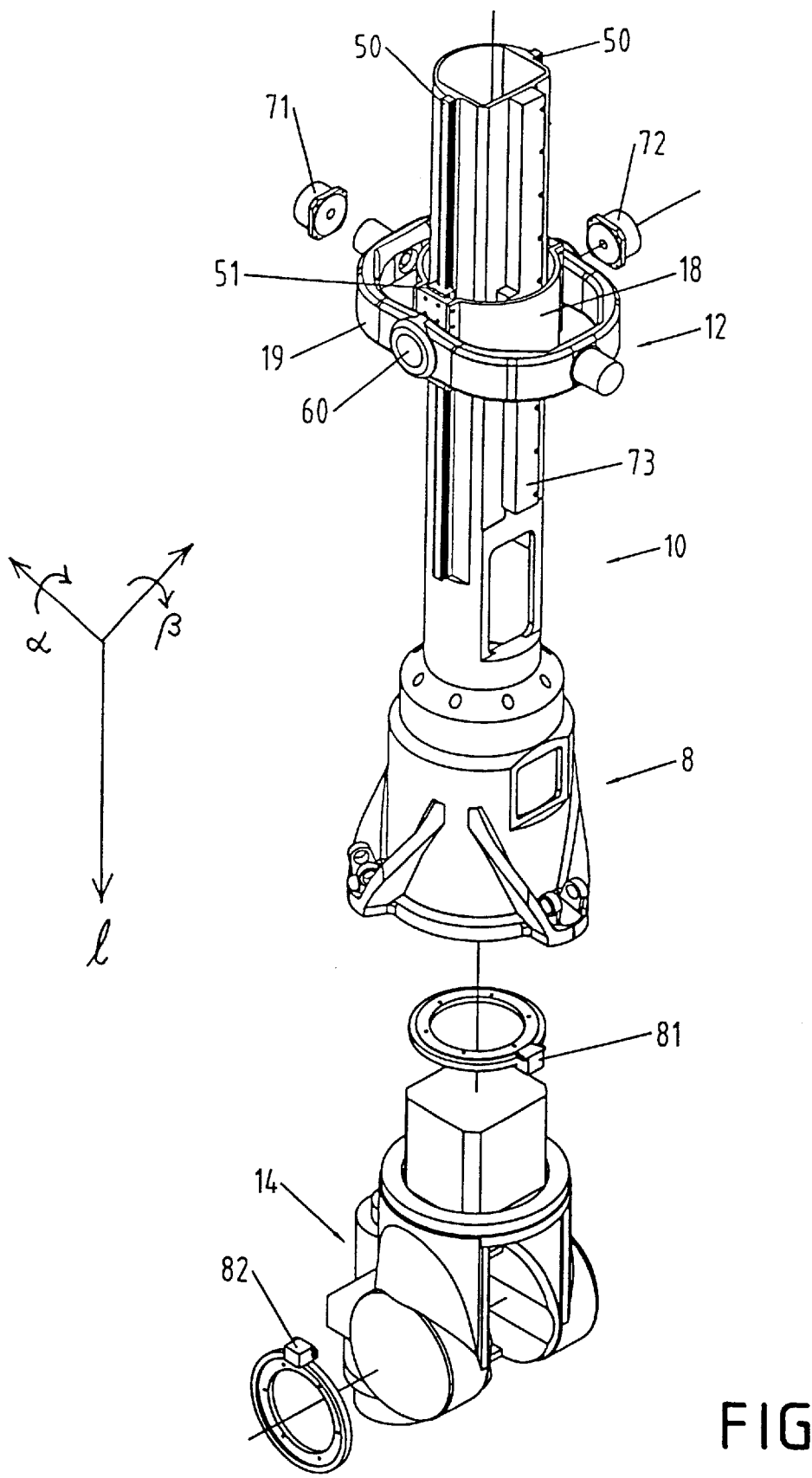
FIG. 3 shows a view in perspective of a central arm controlled in the universal joint, where the joint is provided with sensors operating in a separate coordinate system in accordance with the invention.

FIG. 3 shows the arm 10 and the internal parts of the universal joint 12, i.e. the parts mounted in the universal joint housing 13. These inner parts consist of an inner ring 18 and an outer ring 19. The arm 10 can slide in the inner ring 18 but is locked against turning by slide rails 50 placed opposite each other on the arm 10 and running in holders 51 in the inner ring. Externally the inner ring is provided with fixed opposite bearing pins 60 pivotably journalled in the outer ring 19. The outer ring is also provided with fixed opposite bearing pins 70 journalled in the universal joint housing 13. All bearing pins are arranged in one and the same plane but an axial line through the bearing pins of the inner ring intersects an axial line through the bearing pins of the outer ring at an angle of 90°.

The pattern of movement for the arm 10 in the universal joint 12 is such that it can be turned an angle α about a first universal axis and an angle β about a second universal axis. The arm can also slide the distance l in the inner ring 18. Since the arm is joined to the positioning head 8 this means that it can assume all the positions $X_n$, $Y_n$, $Z_n$ in a defined work space which is only limited by the construction of the robot.

FIG. 3 also shows that the outer ring 19 is provided with a first angle sensor 71, see also FIG. 1, which detects the angle α of the arm about the first universal axis. The outer ring is also provided with a second angle sensor 72 which detects the angle β of the arm about the second universal axis. Furthermore, a length sensor 73, preferably in the form of a glass scale, is arranged along the arm to detect the length location l of the arm. These three sensors produce coordinates corresponding to the location of the positioning head 8 in a spherical coordinate system indicated in FIG. 3. This location in the spherical coordinate system represents the actual location of the positioning head 8. This actual location is obtained in the above-mentioned cartesian coordinate system by means of a coordinate transformation.

The coordinate transformation is obtained by the equations:

$X_a$=l sin α cos β

$Y_a$=l sin α sin β

$Z_a$=l cos α cos α

The positioning head 8 is thus controlled in the cartesian coordinate system to the location ($X_b$, $Y_b$, $Z_b$) representing a set point. The location is thereafter detected by the sensors 71, 72, 73 which indicate an actual location (α, β, l) in the spherical coordinate system. The coordinate transformation is performed, whereupon an actual location ($X_a$, $Y_a$, $Z_a$) is obtained in the cartesian coordinate system. After that the difference (ΔX, ΔY, ΔZ) is calculated between the set point and the actual position in the cartesian coordinate system. This difference is finally added to the previous set point ($X_b$, $Y_b$, $Z_b$) in order to obtain a new set point ($X_n$, $Y_n$, $Z_n$). These detections and calculations are repeated continuously for feedback control, and increased accuracy of the location of the positioning head is achieved through compensation for force, temperature and mechanical deviations in the machine.

The deviation (ΔX, ΔY, ΔZ) between set point (X, Y, Z) and actual location ($X_a$, $Y_a$, $Z_a$) is thus added in the cartesian coordinate system to the previous set point ($X_b$, $Y_b$, $Z_b$), thus giving a new set point $X_n$=$X_b$+ΔA, $Y_n$=$Y_b$+ΔY, $Z_n$=$Z_b$+ΔZ. This calculation and correction is then repeated for continuous control of the set point.

FIG. 3 also shows that a tool head 14, movable in at least two axes, is connected to the positioning head 8. Turning about these axes is also detected by sensors 81, 82 which may also be included in the control system for correcting the set point. If the number of axes for the tool head is two, a robot with 5 axes will be obtained. More axes are also possible.

What is claimed is:

1. A control system for a robot (1), which robot comprises at least three setting devices (2, 3, 4) which can be extended or shortened in the longitudinal direction, each setting device being directly or indirectly secured in a fixed frame (6) via a first joint (20, 30, 40) so that each setting device is pivotable in all directions in relation to the frame and that each setting device is attached at one end in a movable positioning head (8) via a second joint (21, 31, 41), and also a rigid arm (10) joined to and emanating from the positioning head and arranged between the setting devices, the arm being radially guided but axially displaceably journalled in a universal joint (12) relative to and rigidly connected to the frame, each setting device being provided with a length sensor ($LS_1$, $LS_2$, $LS_3$), said sensors forming a part of a control system (S1) for controlling the location (X, Y, Z) of the positioning head in the work space of the robot characterized in that the control system cooperates with a feedback control system (R2) arranged to correct the location (X, Y, Z) of the positioning head in the work space and that the control system (S1) and feedback control system (R2) operate in accordance with different coordinate systems.

2. A control system as claimed in claim 1, characterized in that the control system (S1) is arranged to operate in accordance with a cartesian coordinate system and that the control system (R2) is arranged to operate in accordance with a spherical coordinate system.

3. A control system as claimed in claim 2, characterized in that a first angle sensor (71), a second angle sensor (72), and a length sensor (73) are placed in conjunction with the universal joint, these three sensors (71, 72, 73) indicating the actual location ($\alpha$, $\beta$, l) in accordance with the spherical coordinate system and cooperating with the control system (S1) to determine the deviation ($\Delta X$, $\Delta Y$, $\Delta Z$) between the spatial location of the set point ($X_b$, $Y_b$, $Z_b$) and actual position ($X_a$, $Y_a$, $Z_a$) of the positioning head, whereupon correction of the location ($X+\Delta X$, $Y+\Delta Y$, $Z+\Delta Z$) of the positioning head in the work space of the robot is arranged to be performed.

4. A control system as claimed in claim 3, characterized in that the sensors (71, 72, 73) are placed for measurement on or near a part which is movable in the robot and accompanies movement of the robot, wherein said part is free of tension.

5. A control system as claimed in claim 4, characterized in that the angle sensors (71, 72) of the control system (R2) are placed on the universal joint (12) and that the length sensor (73) is placed on the arm (10).

6. A control system as claimed in claim 5, characterized in that at least two additional angle sensors (81, 82) are connected to the control system, placed on a tool holder (80).

7. A method for controlling the location of a positioning head of a robot, characterized in that a) a control system controls the positioning head in accordance with a cartesian coordinate system, b) a feedback control system senses the location ($\alpha$, $\beta$, l) of the positioning head in accordance with a spherical coordinate system, c) a coordinate transformation is performed of the location ($\alpha,\beta$, l) of the positioning head from the spherical coordinate system to the cartesian coordinate system, d) the deviation $\Delta X$, $\Delta Y$, $\Delta Z$ obtained between set point and actual position in the cartesian coordinate system is added to the previous set point X, Y, Z of the positioning head, thus producing a new set point $X_n=X+\Delta X$, $Y_n=Y+\Delta Y$, $Z_n=Z+\Delta Z$, e) the location of the positioning head is altered to this new set point, f) steps a)–e) are repeated to achieve continuous control of the set point.

8. A method for controlling the location of the positioning head (8) of a robot as claimed in claim 7, characterized in that the method is used in a robot (1) which comprises at least three setting devices (2, 3, 4) which can be extended or shortened in a longitudinal direction, each setting device being directly or indirectly secured in a fixed fram (6) via first joint (20, 30, 40) so that each setting device is pivotable in all directions in relation to the frame and that each setting device is attached at one end in a movable positioning head (8) via a second joint (21, 31, 42), and also a rigid arm (10) joined to and emanating from the positioning head and arranged between the setting devices, the arm being radially guided but axially displaceably journalled in a universal joint (12) relative to and rigidly connected to the frame, each setting device being provided with a length sensor ($LS_1$, $LS_2$, $LS_3$), said sensors forming a part of a control system (S1) for controlling the location (X,Y,Z) of the positioning head in the work space of the robot and in that the control system cooperates with a feedback control system (R2) arranged to correct the location (X,Y,Z) of the positioning head in the work space and that the control system (S1) and feedback control system (R2) operate in accordance with different coordinate systems.

* * * * *